(12) United States Patent
Mandyam

(10) Patent No.: US 6,940,828 B2
(45) Date of Patent: Sep. 6, 2005

(54) APPARATUS, AND ASSOCIATED METHOD, FOR TRANSFORMING DATA IN AN OFDM COMMUNICATION SYSTEM

(75) Inventor: Giridhdar D. Mandyam, Dallas, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/260,170

(22) Filed: Sep. 30, 2002

(65) Prior Publication Data

US 2004/0062212 A1 Apr. 1, 2004

(51) Int. Cl.[7] .......................... H04J 11/00; H04L 27/28
(52) U.S. Cl. ..................... 370/281; 370/206; 370/210; 375/260
(58) Field of Search ................................ 370/203–210, 370/261–295, 430–466; 375/225, 229, 260–298, 371; 708/401, 402

(56) References Cited

U.S. PATENT DOCUMENTS

| | | | | |
|---|---|---|---|---|
| 5,117,381 A | * | 5/1992 | Juri et al. ..................... 708/402 |
| 5,596,518 A | * | 1/1997 | Toyokura et al. ........... 708/402 |
| 6,175,550 B1 | * | 1/2001 | van Nee ...................... 370/206 |
| 6,237,012 B1 | * | 5/2001 | Ohgose ....................... 708/401 |
| 6,263,119 B1 | * | 7/2001 | Martucci ..................... 382/298 |
| 6,282,555 B1 | * | 8/2001 | Ohara ......................... 708/401 |
| 6,611,560 B1 | * | 8/2003 | Kresch et al. ........... 375/240.16 |
| 6,763,072 B1 | * | 7/2004 | Matsui et al. ................ 375/260 |
| 2001/0040928 A1 | * | 11/2001 | Sakoda ........................ 375/260 |
| 2002/0003772 A1 | * | 1/2002 | Matsui ........................ 370/206 |
| 2002/0044524 A1 | * | 4/2002 | Laroia et al. ................ 370/203 |
| 2002/0168016 A1 | * | 11/2002 | Wang et al. ................. 375/260 |
| 2002/0172213 A1 | * | 11/2002 | Laroia et al. ................ 370/430 |
| 2003/0072256 A1 | * | 4/2003 | Kim ............................ 370/208 |
| 2003/0112743 A1 | * | 6/2003 | You et al. .................... 370/203 |
| 2003/0156014 A1 | * | 8/2003 | Kodama et al. ........ 340/310.01 |
| 2003/0165189 A1 | * | 9/2003 | Kadous ....................... 375/225 |
| 2003/0169683 A1 | * | 9/2003 | Mendlovic et al. ......... 370/208 |
| 2003/0198310 A1 | * | 10/2003 | Fanson et al. ............... 375/371 |
| 2003/0227867 A1 | * | 12/2003 | Xiong ......................... 370/210 |

* cited by examiner

Primary Examiner—Man U. Phan
(74) Attorney, Agent, or Firm—Federico Fraccaroli

(57) ABSTRACT

Apparatus, and an associated method, for facilitating communications in an OFDM communication system. A sending station of the OFDM communication system performs inverse discrete trigonometric transforms upon modulation symbols representative of data that is to be communicated. And, a transformed vector is formed by the inverse discrete trigonometric transformer. A symmetric extension adder adds an extension to the transformed vector to attain desired symmetry or anti symmetry properties. The apparatus formed at a receiving station of the OFDM system includes a discrete trigonometric transformer for performing transform operations upon data received thereat.

12 Claims, 4 Drawing Sheets

APPARATUS, AND ASSOCIATED METHOD, FOR TRANSFORMING DATA IN AN OFDM COMMUNICATION SYSTEM

The present invention relates generally to a manner by which to facilitate communications in a communication system, such as a WLAN (wireless local area network) or fourth-generation (4G) cellular communication system, that utilizes OFDM (orthogonal frequency division multiplexing) techniques. More particularly, the present invention relates to apparatus and an associated method, for transforming data, that is to be communicated during operation of the communication system, through the use of discrete trigonometric transform techniques.

By using trigonometric transform techniques, the conventional need always to transmit data in quadrature is obviated. Single side band (SSB) modulation of the data can, e.g., be utilized. And, communication performance can be improved relative to the use of conventional Fourier transform techniques, when data is to be communicated upon communication channels that exhibit certain channel conditions. And, a selected discrete trigonometric transform is selected to be used, depending upon channel conditions, to best communicate data pursuant to a communication service.

BACKGROUND OF THE INVENTION

Communication of data is a necessary adjunct of modern society. Data is communicated to effectuate many different types of communication services. Data communication systems are provided through which to effectuate the communication of the communication service.

A communication system is formed, at a minimum, of a sending station and a receiving station, connected theretogether by way of a communication channel. Data that is to be communicated by the sending station is converted, if necessary, at the sending station into a form to permit its communication upon the communication channel. The receiving station operates to detect the data communicated upon the communication channel. Once detected at the receiving station, the informational content of the data is recovered.

Many different types of communication systems have been developed and implemented. Different types of communication systems are utilized to effectuate different types of communication services. And, as advancements in communication technologies permit, improvements to existing communication systems are made, and new types of communication systems are developed. The advancements, generally, permit data to be communicated at increased throughput rates and in manners to increase the likelihood that the informational content of the data can be recovered at a receiving station in spite of poor communication channel conditions.

A radio communication system is a type of communication system. In a radio communication system, communication channels are defined upon radio links formed between the sending and receiving stations of the communication system. Such communication channels, referred to as radio communication channels, do not require that a wireline connection interconnect the sending and receiving stations. Construction of the infrastructure of a radio communication system, as a result, is generally less costly than the corresponding construction costs of the infrastructure of a conventional, wireline communication system. And, a radio communication system can be implemented as a mobile communication system as communications are effectuated by way of radio channels rather than fixed, wireline channels.

Radio links, upon which the radio communication channels are defined, are formed upon a portion of the electromagnetic spectrum. The portion of the electromagnetic spectrum allocated for use by a particular radio communication system is typically band width-constrained. That is to say, the communication capacity of a radio communication system is limited by the amount of spectrum allocated to the communication system. The only manner by which to increase the communication capacity of such a system is to increase the efficiency by which to utilize the spectrum allocated to the communication system.

Digital communication techniques permit increased efficiency of usage of the spectrum allocated to the communication system. First use of such techniques, therefore, in a communication capacity of a radio system generally can be increased.

Typically, digital communication techniques involve the digitizing of the data that is to be communicated. When the data is digitized, the data becomes formed of digital bits. The digitized bits are sometimes formatted into sequences according to a formatting scheme to form packets or frames of data.

The data, once formatted into the packets or frame, are communicated during discrete intervals upon a communication channel. Once delivered to a receiving station, the packets or frames are concatenated together, and the informational content of the data is recovered. Because the data can be communicated at discrete intervals, a circuit-switched connection need not be maintained between receiving communication station. Instead, packet-switched channels can be used in which two, or more, sending and receiving station pairs can share the same radio link or channel.

Conventional local area networks (LANs) communicate packets of data to effectuate communications between sending and receiving stations defined therein. Wireless networks, operable in manners analogous to LANs, referred to as WLANs (wireless local area networks) have also been developed and also are utilized to communicate data upon radio channels defined upon radio links.

A variant of an IEEE (Institute of Electrical and Electronic Engineers) 802.11 operating specification sets forth a wireless operating protocol that has been proposed as the operating standard for a WLAN. And, the operating specification has been proposed as the operating protocol by which to operate a so-called $4^{th}$ generation (4G) cellular communication system. The operating specification of the IEEE 802.11 standard sets forth an operating protocol for multi-user communications.

At least one implementation of a WLAN anticipates, or otherwise uses, OFDM (orthogonal frequency division multiplexing) techniques. OFDM techniques effectively form a hybrid of a multi-carrier modulation (MCM) and frequency shift keying (FSK) modulation. Frequency-divided carrier frequencies are defined in an OFDM system. And, the carriers are selected to be orthogonal to one another, such as by separating the carriers by integer multiples of the inverses of symbol duration of parallel bit streams that are to be applied thereto. The orthogonal carriers are transmitted simultaneously, thereby permitting an entire allocated channel to be occupied through an aggregated sum of narrow, orthogonal sub-bands.

Conventionally, OFDM techniques perform transformations between time-domain data and frequency-domain data through the use of a unitary transformation, namely the discrete Fourier transform (DFT). And, through use of such a DFT together in conjunction with the use of cyclic prefixes permits a receiving station to be of relatively simple construction in the presence of frequency-selective channel conditions.

A DFT is, however, a complex transform. And, data that is transmitted in a communication system that utilizes OFDM techniques must be transmitted in quadrature. Single side band transmissions, for example, cannot be transmitted in a DFT-based OFDM system. Also, through the use of the DFT as a sole unitary transformation used in OFDM-based systems, the use of other transformation-types that might be more appropriate for particular communication channel conditions are, in existing systems, unavailable.

While use of non-DFT, unitary transformations have been considered for use in various communication systems, the use of such transformations have not been considered in a manner that would limit the complexity required of equalization operations at a receiving station operable in such a system.

If a manner could be provided by which to utilize non-DFT transformations in an OFDM communication system, improved communication performance would be possible.

It is in light of this background information related to communication systems that utilize OFDM techniques that the significant improvements of the present invention have evolved.

SUMMARY OF THE INVENTION

The present invention, accordingly, advantageously provides apparatus, and an associated method, by which to facilitate communications in a communication system, such as a WLAN or cellular communication system, that utilizes OFDM (orthogonal frequency division multiplexing) techniques.

Through operation of an embodiment of the present invention, a manner is provided for transforming data, that is to be communicated during operation of the communication system, through the use of discrete trigonometric transform techniques.

Non-DFT (non-discrete Fourier transform) techniques, such as trigonometric transform techniques, are used. The conventional need otherwise always to transmit data in quadrature is obviated. Single side band (SSB) modulation of the data can, for example, be utilized. Communication performance, such as data throughput rates, can be improved, relative to communication systems that require the use of discrete Fourier transform techniques. And, by permitting selection of a particular discrete trigonometric transform, selection of the transform is matched with the communication channel conditions so that the communication performance of the sending and receiving station are optimized.

In one aspect of the present invention, an inverse discrete trigonometric transform is provided for a sending station of an OFDM communication system. Data that is to be communicated by the OFDM sending station is formatted into data vectors. Successive ones of the data vectors are applied to the inverse discrete trigonometric transformer to be transformed thereat. Each data vector is formed of modulation symbols that are applied, in parallel, to the inverse discrete trigonometric transform. Transformed values are generated by the inverse discrete trigonometric transformer, also in parallel as a transformed vector.

In another aspect of the present invention, symmetric extensions are added to the transformed vectors formed by the inverse discrete trigonometric transformer. The extensions are added to the transformed vectors to achieve desired cyclic shift properties for the trigonometric transform. Subsequent to addition of the symmetric extension, guard intervals are added, and the transformed vector, modified by the symmetric extension, is converted into serial form.

In another aspect of the present invention, apparatus is provided for a receiving station operable in an OFDM communication system. The receiving station includes a discrete trigonometric transformer for transforming OFDM symbols applied thereto. The discrete trigonometric transformer is matched to the inverse discrete trigonometric transformer that forms part of the sending station of the OFDM system. When delivered to the receiving station, the serially delivered OFDM symbols are converted into vector form and are then applied to the discrete trigonometric transformer.

In another aspect of the present invention, the inverse discrete trigonometric transformer, and the matched, discrete trigonometric transformer, are formed alternately, or in combination, an inverse discrete cosine transformer and an inverse discrete sine transformer. The symmetric extension is added by the symmetric extension adder adds extensions corresponding to which of the transformer-types is utilized. When both inverse discrete cosine and inverse discrete sine transformers are utilized, modified vectors form responsive to operation thereof are summed together prior to communication by the sending station to the receiving station.

In one implementation, apparatus is provided for a WLAN (wireless local area network). The apparatus includes an inverse discrete trigonometric transformer formed at an OFDM sending station and a discrete trigonometric transformer formed at an OFDM receiving station of the WLAN.

In these and other aspects, therefore, apparatus, and an associated method, is provided for a communication system having a sending station that utilizes OFDM (orthogonal frequency duplex multiplexing) techniques to communicate data. The data is formatted into data vectors. Formation of OFDM symbols is facilitated. An inverse discrete trigonometric transformer is coupled to receive successive ones of the data vectors into which the data to be sent by the sending station is formatted. The inverse discrete trigonometric transformer transforms values of the successive ones of the data vectors into inverse-transformed form as transformed values. The transformed values are used to form OFDM symbols.

A more complete appreciation of the present invention and the scope thereof can be obtained from the accompanying drawings that are briefly summarized below. The following detailed description of the presently-preferred embodiments of the invention, and the appended claims.

DETAILED DESCRIPTION

Figure 1:
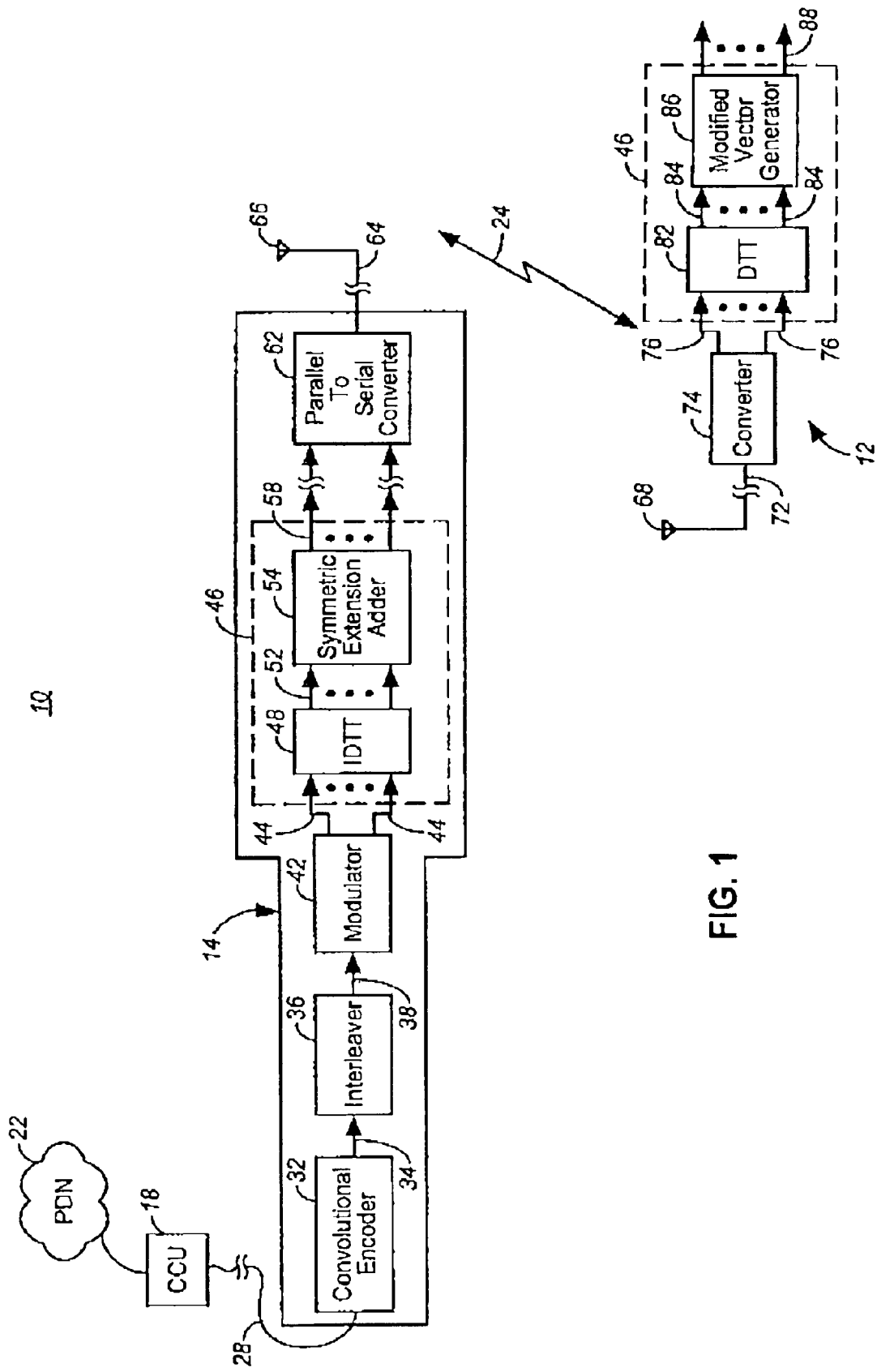
FIG. 1 illustrates a functional block diagram of a radio communication system in which an embodiment of the present invention is operable.

Referring first to FIG. 1, a communication system, shown generally at 10, provides for radio communications with mobile stations, of which an exemplary mobile station 12 is shown in the figure. Two-way radio communications with the mobile station are effectuated during operation of the communication system.

The communication system, in the exemplary implementation, forms a WLAN (wireless local area network) constructed to be operable generally pursuant to a variant of the IEEE 802.11 communication standard. Here, OFDM (orthogonal frequency division multiplexing) communication techniques are utilized. While the following description of the exemplary implementations of the present invention shall describe operation of the present invention with respect to its exemplary implementation in which the communication system is formed of a WLAN, other communication systems can analogously be represented. For instance, the communication system in which an embodiment of the present invention is implemented can form a cellular communication system having characteristics associated with a proposed fourth-generation (4G) communication system, such as a system proposed pursuant to an IETF standards-creating task force. Description of an embodiment of the present invention, accordingly, is analogous to that described below with respect to its implementation in the WLAN.

The network part of the WLAN includes a plurality of spaced-apart access points (APs). A single access point 14 is shown in the figure. In an actual WLAN, the network part of an actual WLAN typically includes a plurality of access points, typically also permitting communication handoffs between successive ones of the access points as a mobile station travels throughout an area encompassed by the WLAN.

The access point 14 is coupled to a central control unit (CCU) 18. The central control unit 18 provides control functions to various aspects of operation of the WLAN. And, in turn, the central control unit is connected to an external communication network, here a packet data network (PDN) 22, such as the internet backbone. Other communication devices, not separately shown, are also connected, or otherwise coupled, to the packet data network. Communication paths are formable through the network part of the WLAN, upon radio links, here designated at 24, extending between the network part of the WLAN and the mobile station 12.

Forward link channels are defined upon the radio link 24 upon which to communicate forward-link data from the network part to the mobile station. And, reverse-link channels are defined upon the radio link 24 upon which to communicate reverse-link data from the mobile station to the network part of the communication system. Both the access point and the mobile station utilize OFDM techniques, and the forward and reverse link channels are defined upon separate, orthogonal subcarriers of the radio link.

More particularly, the mobile station and the access point each include radio transceiver circuitry capable of both sending and receiving data upon the forward and reverse link channels defined upon the orthogonal subcarriers of the radio link 24. In the exemplary implementation, elements of the present invention are embodied at both the transmit and receive parts of both of the access point and the mobile station. For purposes of explanation, the elements of an embodiment of the present invention are shown to form portions of the access point and portions of the receive part of the mobile station. Corresponding elements, in the exemplary implementation, also form portions of the transmit part and the receive part of the mobile station and access point, respectively.

Here, the data that is to be communicated by the access point to the mobile station is formed on the lines 28 and encoded here by a convolutional encoder 32. Convolutionally encoded data is generated on the line 34 and applied to an interleaver 36. Interleaving of the convolutionally-encoded data is performed by the interleaver, and interleaved data is formed on the line 38. The line 38 is coupled to a modulator 42. The modulator 42 is operable pursuant to a modulation scheme, such as a QPSK (quartenary phase shift keying) scheme, or other appropriate scheme, to form modulation symbols, here on the lines 44. The modulated symbols together define data vectors that are applied to apparatus 46 of an embodiment of the present invention. The apparatus includes an inverse discrete trigonometric transformer (IDTT). The inverse discrete trigonometric transformer generates transformed OFDM symbols on the lines 52. The symbols collectively, at a given time, define transformed data vectors.

In one implementation, the lines 52 are coupled to a symmetric extension adder 54 that selectably also forms a portion of the apparatus 46. The extension adder operates to add symmetric, or anti-symmetric, as appropriate, extensions of the data applied thereto, i.e., the modified data vector, in order to attain cyclic shift properties for the transformed data. In an implementation in which the extensions are not required, the need for a symmetric extension adder is obviated. Such a need, in some situation reduces the throughput capability of the sending station relative to conventional sending stations that utilize conventional discrete Fourier transform (DFT) techniques. For normal QAM (quadrature amplitude modulation) modulation when the communication channels upon which the data is to be communicated does not exhibit significant ISI (inter-symbol interference) conditions. But when other modulation schemes are used, such as BPSK (binary phase shift keying), as well as under certain ISI conditions, communication performance of the transmit part of the access point, as well as other sending stations, is improved relative to conventional implementations.

Modified, transformed vectors are formed by the symmetric extension adder 54, values of which are generated upon the lines 58 and applied to additional circuitry of the transmit part. And, in an implementation in which the symmetric extension adder is not utilized, the lines 52 containing the values of the transformed ODFM symbols become the lines 58. Viz, the lines 52 and 58 correspond. Here, the additional circuitry is shown to form a guard interval adder and a parallel-to-serial converter 62. OFDM symbols are generated in serial manner on the line 64. The line 64 extends to antenna circuitry 66 to be transduced into electromagnetic form thereat and communicated upon the forward link channels to the mobile station.

The mobile station operates to detect the data, formed of OFDM symbols, communicated thereto upon the OFDM subcarriers. The mobile station includes antenna circuitry 68 that operates to detect, and convert into electrical form, the data communicated thereto. The data is provided, by way of the line 72, to a guard interval remover and serial-to-parallel converter 74. The data, once converted into parallel form, is provided, by way of the line 76, to additional apparatus 46 of an embodiment of the present invention. The apparatus 46 embodied at the receive part of the mobile station includes a discrete trigonometric transformer (DTT) 82. The discrete trigonometric transformer performs discrete trigonometric transforms upon the data vectors applied thereto and forms transformed vectors on the lines 84 that are applied to an element 86. And, the element 86 forms modified vectors on the lines 88. Additional elements (not shown in the figure) operate upon the data to recover the informational content thereof and to provide the data to an appropriate data sink.

In contrast to conventional sending and receiving stations, the need to utilize discrete Fourier transforming techniques is obviated. Instead, non-DFT unitary transformations are used in OFDM systems that employ cyclic prefixes. These non-DFT unitary transformations, i.e., sinusoidal transformations or discrete trigonometric transformations, exhibit properties similar to discrete Fourier transforms that make use of cyclic prefixes when the input vectors applied to such transforming elements employ a form of symmetry or anti-symmetry. The sinusoidal transforms employ real-valued basis functions in contrast to complex valued basis functions that are used pursuant to discrete Fourier transformations. Because of this, single-side band (SSB) transmission is permitted through the use of sinusoidal transforms. When a communication system is significantly band width-limited, SSB transmissions advantageously reduce band width requirements.

Use of the discrete trigonometric transforms can also be advantageous when data is communicated upon communication channels that exhibit intersymbol interference (ISI). Namely, the use of the discrete trigonometric transforms improves communication performance, relative to use of conventional DFT transforms, when the guard intervals between OFDM symbols is not great enough to capture the delay spreads of the channel upon which the data is communicated. Even though symmetric or anti-symmetric extensions are required to be added to the data that is to be communicated to achieve cyclic shift properties of the transformed values, under the ISI conditions, the throughput rates that can be achieved are increased relative to the use of conventional DFT techniques.

Figure 2:
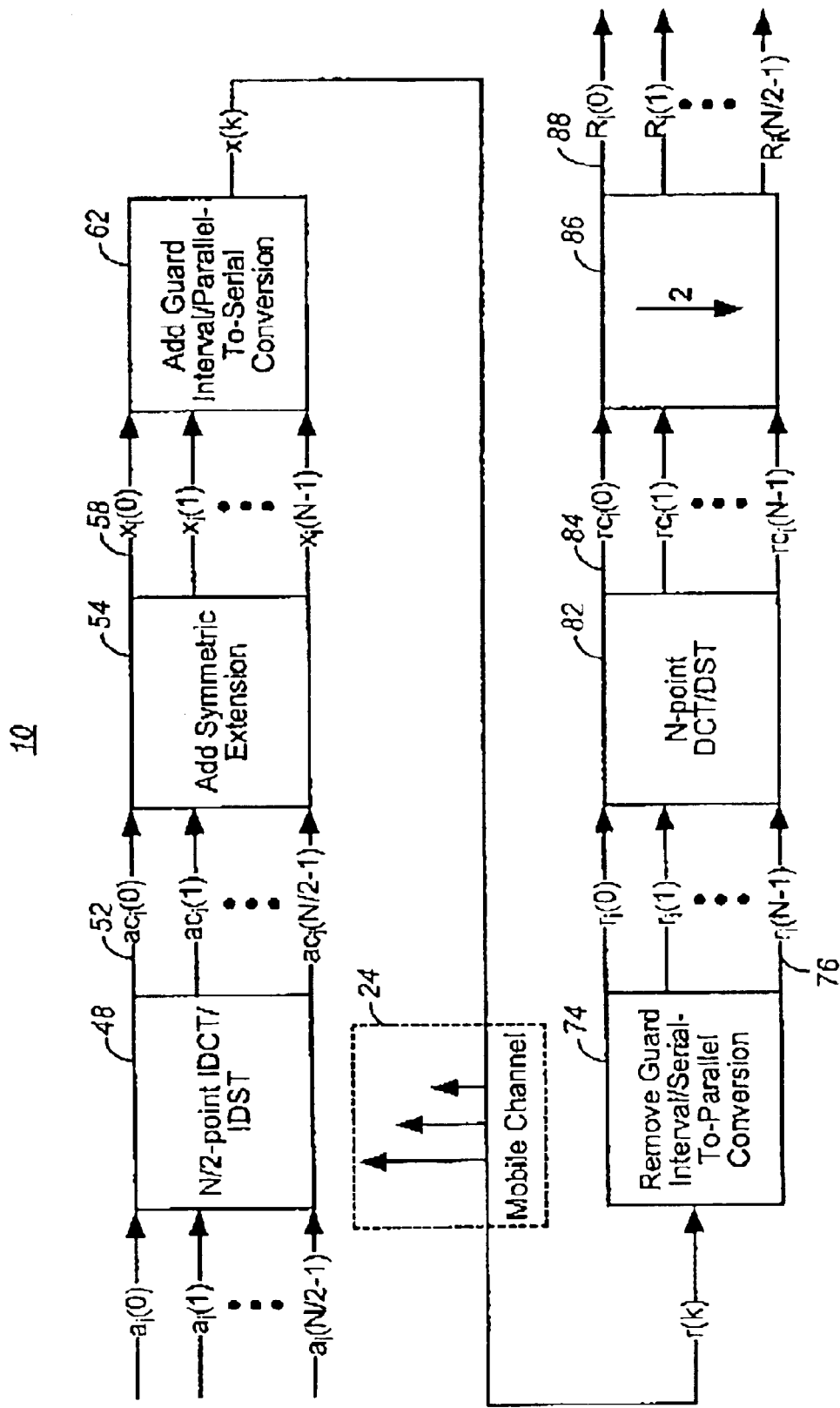
FIG. 2 illustrates a functional block diagram of portions of the communication system shown in FIG. 1 of an exemplary implementation of an embodiment of the present invention.

FIG. 2 illustrates portions of the communication system 10 shown in FIG. 1. Here again, portions of the transmit part of the access point and portions of the receive part of the mobile station are shown. And, the forward-link channels defined upon the radio link 16 are also again shown.

The modulated symbols, $a_i$, are applied to a N/2-inverse discrete cosine transformer (IDCT) or inverse discrete sine transformer (IDST) 48. The IDCT and IDST are both inverse discrete trigonometric transforms. Transformed values, $ac_i$, and generated on the lines 52 are applied to the symmetric extension adder 54. The symmetric extension adder 54 operates to add extensions to the modified vector applied thereto to make the vector symmetric or anti-symmetric, as appropriate. And, modified, transformed vector values, $x_i$, are formed on the lines 58 and applied to the guard interval adder and parallel-to-serial converter 62. A serial stream of OFDM symbols, x(k) are generated and subsequently communicated upon the forward-link channels of the radio links 24.

The receive part of the mobile station receives the OFDM symbols, r(k), subsequent to their communication upon the forward-link channels of the radio link 16. The values are applied to a guard interval remover and serial-to-parallel converter 74. Parallel values, $r_1$, are generated on the lines 76 and applied to N-point DCT-DST (discrete cosine transformer/discrete sine transformer) 82. The transformer performs cosine or sine transforms, and the transformed values are generated as vectors, having values $rc_i$ on the lines 84. Subsequent operations are performed upon the values by the element 86, and modified values $R_i$ are generated on the lines 88.

Figure 3:
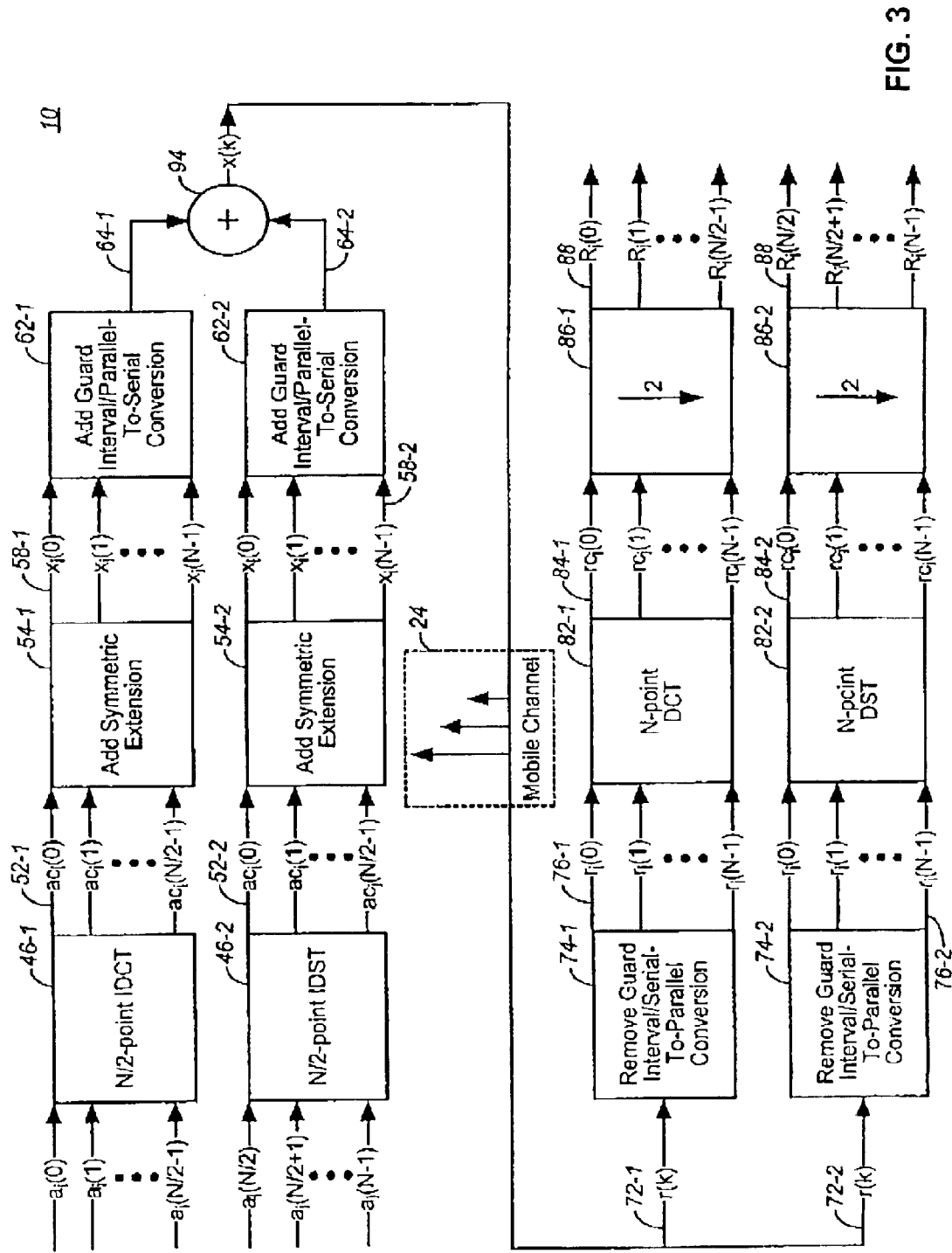
FIG. 3 illustrates a functional block diagram, similar to that shown in FIG. 2, but of another exemplary implementation of an embodiment of the present invention.

FIG. 3 illustrates portions of the transmit part of the access point and portions of the receive part of the mobile station of another exemplary embodiment of the present invention. Here, both discrete cosine and discrete sine transformations are performed upon data that is to be communicated by the access point and upon data that is received by the mobile station. A first group of the modulation symbols that are to be communicated by the access point are applied to a N/2-point IDCT 46-1. And, a second group of the modulation symbols are applied to a N/2-point IDST 46-2. The respective elements perform inverse discrete cosine and sine transforms, respectively, and generate transformed vector values $ac_i$ on the lines 52-1 and 52-2. The lines 52-1 extend to a symmetric extension adder 54-1 and the line 52-2 extend to a symmetric extension adder 54-2. The symmetric extension adders modify the vectors applied thereto and generate values of a modified, transformed vector on the lines 58-1 and 58-2. And, the lines 58-1 and 58-2 extend to guard interval adder and parallel-2 serial converters 62-1 and 62-2, respectively. OFDM symbols are serially generated on the lines 64-1 and 64-2 that extend to a summing element 94. The summing element sums together the values generated upon the respective lines to form OFDM symbols, x(k) that are communicated upon the forward-link channels of the radio link 24.

Subsequent to communication upon the forward-link channels, received values, r(k) are applied, by way of the lines 72-1 and 72-2 to guard interval removers and serial-2 parallel converters 74-1 and 74-2, respectively. Parallel vector values, $r_i$ are generated on the lines 76-1 and 76-2 and are applied to an N-point DCT 82-1 and an N-point DCT 82-2. Transformed vector values, $rc_i$, are generated on the lines 84-1 and 84-2, respectively. And, further actions are performed on the values by the elements 86-1 and 86-2 to generate new values $R_i$ on the lines 88-1 and 88-2.

The performance of an OFDM system, such as the system 10, can be predicted, assuming that the multi-path channel profile of the communication channel is defined upon the radio link 16 are static. When the profile is static, even if the cyclic prefix is not of sufficient length to encompass a maximum delay spread of the channel, the resultant interference can at least be characterized. In the event of an insufficiently-long, cyclic prefix, there are two sources of interference, the inter carrier interference (ICI) and the inter symbol interference (ISI). The inter carrier interference occurs as a result of "late-arriving" multipaths, i.e., multipaths whose excess delay is longer than the cyclic prefix duration. Values on such multipaths cannot be perfectly demodulated using a forward transform operation for a given OFDM symbol. And, the inter symbol interference results due to "leakage" of late-arriving multipath information corresponding to a previously-received OFDM symbol into an OFDM symbol being currently decoded. By characterizing the ICI and ISI, the throughput of a given transform with respect to a given set of channel conditions can be predicted. And, as a result of such predictions, the best transform for a particular OFDM transmission, e.g., a DCT or a DST, is selected.

Figure 4:
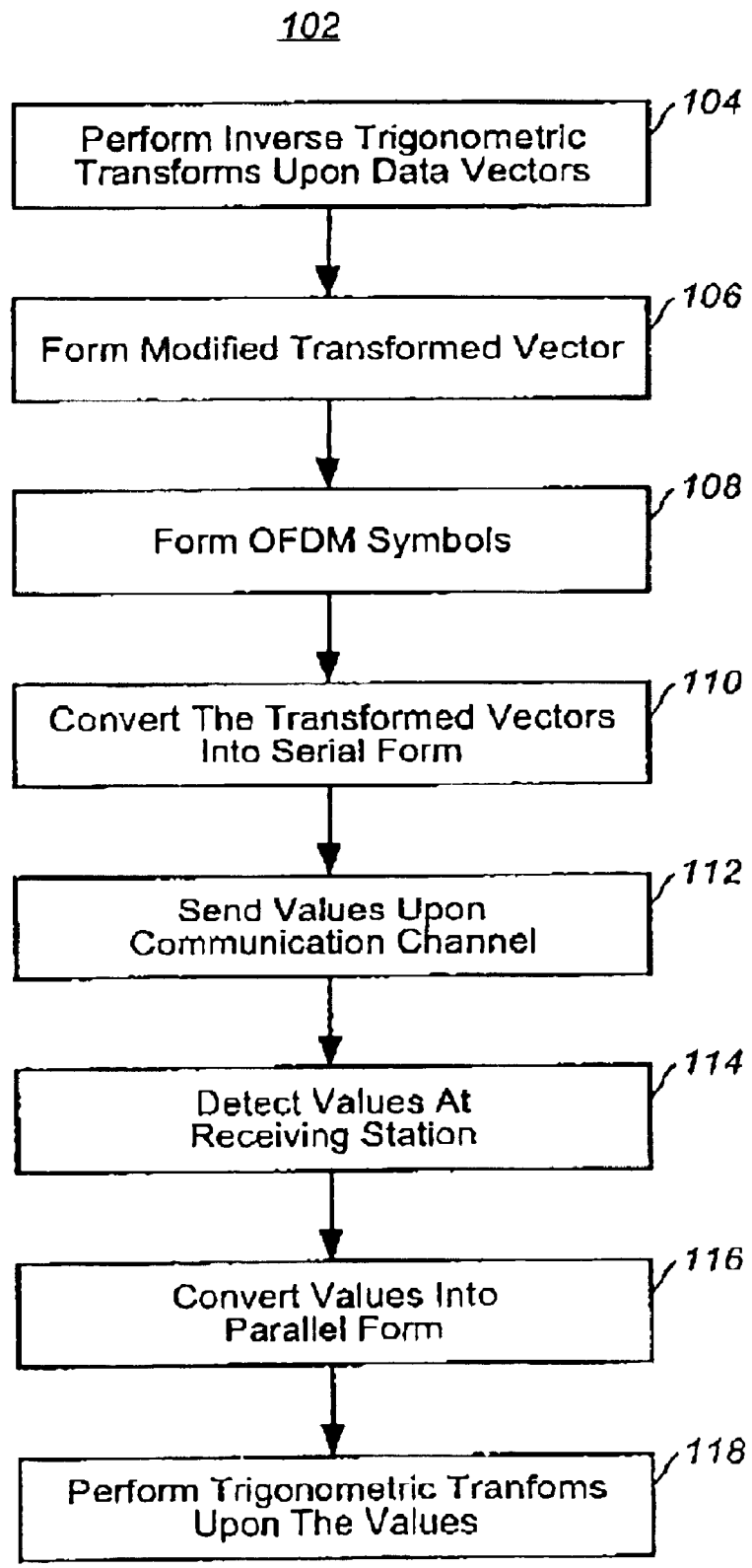
FIG. 4 illustrates a functional block diagram, similar to those shown in FIGS. 2 and 3, but of another exemplary implementation of an embodiment of the present invention.

FIG. 4 illustrates a method, shown generally at 102, of the method of operation of an embodiment of the present invention. The method facilitates formation of an OFDM symbol in a communication system having a sending station that utilizes OFDM techniques to communicate data formatted into data vectors.

First, and as indicated by the block 104, inverse trigonometric transforms are performed upon successive ones of the data vectors into which the data to be sent by the sending station is formatted. Then, and as indicated by the block 106, additional values are added to the transformed vector, thereby to form a modified transformed vector that exhibits a selected symmetry property. The modified transformed vector is used, as indicated by the block 108, to form OFDM symbols.

Then, and as indicated by the block 110, the transformed vectors converted into serial form. And, as indicated by the block 112, the values, forming the OFDM symbols, are sent upon a communication channel.

Thereafter, and as indicated by the block 114, the values are detected at a receiving station. Then, as indicated by the block 116, the values are converted into parallel form. And, as indicated by the block 118, trigonometric transforms are performed upon the values.

Thereby, a manner is provided by which to facilitate communications in an OFDM communication system. Trigonometric transform techniques are utilized instead of Fourier transform techniques. Single side-band modulation techniques can therefore be used and, depending upon channel conditions upon the communication channel upon which OFDM symbols are communicated, communication performance of the communication system can be improved.

The previous descriptions are of preferred examples for implementing the invention, and the scope of the invention should not necessarily be limited by this description. The scope of the present invention is defined by the following claims:

What is claimed is:

1. Apparatus for a communication system having a sending station that utilizes OFDM (Orthogonal Frequency Duplex Multiplexing) techniques to communicate data, the data formatted into successive data vectors, said apparatus for facilitating formation of an OFDM (Orthogonal Frequency Division Multiplexing) symbol, said apparatus comprising:
   an inverse discrete trigonometric transformer formed of both an inverse discrete cosine transformer and an inverse discrete sine transformer, the inverse discrete cosine transformer coupled to receive a first portion of each of the successive ones of the data vectors into which the data to be sent by the sending station is formatted, and the inverse discrete sine transformer coupled to receive a second portion of each of the successive ones of the data vectors; said inverse discrete trigonometric transformed for transforming values of the successive ones of the data vectors into inverse-transformed form, as transformed values, the transformed values used to form OFDM symbols.

2. The apparatus of claim 1 wherein each data vector of the successive ones of the data vectors is formed of modulation symbols and wherein the modulation symbols of a data vector of each of the successive ones of the data vector are applied in parallel to said inverse discrete trigonometric transformer.

3. The apparatus of claim 2 wherein said inverse discrete trigonometric transformer forms a transformed value for each modulation symbol, and generates a transformed vector formed of transformed values for each of the modulation symbols applied thereto.

4. The apparatus of claim 3 further comprising a symmetric extension adder coupled to said inverse discrete trigonometric transformer, said symmetric extension adder for adding additional values to the transformed vector, thereby to form a modified transformed vector exhibiting a selected symmetry property.

5. The apparatus of claim 4 wherein the selected symmetry property exhibited by the modified transformed vector formed by said symmetric extension adder comprises a symmetrical arrangement.

6. The apparatus of claim 4 wherein the selected symmetry property exhibited by the modified transformed vector formed by said symmetric extension adder comprises an asymmetric arrangement.

7. The apparatus of claim 4 said symmetric extension adder adds the additional values to the transformed vector by replicating at least a portion of the transformed vector.

8. The apparatus of claim 1 further comprising a summer coupled to inverse discrete cosine transformer and to said inverse discrete sine transformer to receive representations of the transformed values formed thereat, said summer for summing the representations together and for forming the OFDM symbols therefrom.

9. The apparatus of claim 1 further comprising a parallel-to-serial converter coupled to said inverse discrete trigonometric transformer to receive representations of the transformed values formed thereat, said parallel-to-serial converter for forming a serial sequence of OFDM symbols.

10. The Apparatus of claim 1 wherein the sending station sends the data upon a communication channel to a receiving station, said apparatus further comprising:
    a discrete trigonometric transformer embodied at the receiving station and coupled to receive representatives of the OFDM symbols formed at the sending station and sent upon the communication channel to the receiving station, said discrete trigonometric transformer for transforming the OFDM symbols into nontransformed form.

11. The apparatus of claim 10 wherein said discrete trigonometric transformer performs transforms corresponding to, but inverse of, transforms performed by said inverse discrete trigonometric transformer.

12. Apparatus for a communication system having a sending station that utilizes OFDM (Orthogonal Frequency Duplex Multiplexing) techniques to communicate data upon a communication channel, the data formatted into data vectors, said apparatus for facilitating formation of an OFDM (Orthogonal Frequency Division Multiplexing) symbol, said apparatus comprising:
    an inverse discrete trigonometric transformer coupled to receive successive ones of the data vectors into which the data to be sent by the sending station is formatted, said inverse discrete trigonometric transformed for performing one of a first inverse discrete trigonometric transform and at least a second inverse discrete trigonometric transform for transforming values of the successive ones of the data vectors into inverse-transformed form, as transformed values, the transformed values used to form OFDM symbols, performance of the one of the first and at least second inverse discrete trigonometric transforms, respectively, made responsive to communication conditions upon the communication channel.

* * * * *